United States Patent [19]

Suzuki et al.

[11] Patent Number: 4,579,591

[45] Date of Patent: Apr. 1, 1986

[54] DESENSITIZING SOLUTION FOR USE IN OFFSET PRINTING

[75] Inventors: Hiroaki Suzuki; Masao Tanaka; Masato Iwai; Sadao Osawa; Nobuyuki Kita, all of Shizuoka, Japan

[73] Assignees: Tomoegawa Paper Co. Ltd., Tokyo; Fuji Photo Film Co., Ltd., Kanagawa, both of Japan

[21] Appl. No.: 632,169

[22] Filed: Jul. 19, 1984

[30] Foreign Application Priority Data

Jul. 19, 1983 [JP] Japan ................................ 58-130348

[51] Int. Cl.[4] .......................... C09D 5/20; B41M 5/00; G03E 13/06

[52] U.S. Cl. ........................................ 106/2; 101/465; 430/97; 430/331

[58] Field of Search ............................ 106/2; 252/79.4; 101/465; 430/97, 331

[56] References Cited

U.S. PATENT DOCUMENTS 3,592,640 7/1971 Van Engeland et al. .......... 101/465

FOREIGN PATENT DOCUMENTS 10003 1/1979 Japan .................................. 101/465

5799 7/1982 Japan .

*Primary Examiner*—Mary F. Downey

*Attorney, Agent, or Firm*—Sughrue, Mion, Zinn, Macpeak and Seas

[57] ABSTRACT

A cyan-free desensitizing solution for use in offset printing comprising as the effective ingredients:

(a) at least one member selected from the group of an ammonium salt and amine salt of inositol hexaphosphate ester;

(b) a water-soluble cationic polymer; and (c) a low molecular weight electrolyte.

15 Claims, No Drawings

DESENSITIZING SOLUTION FOR USE IN OFFSET PRINTING

FIELD OF THE INVENTION

The present invention relates to a cyan-free desensitizing solution for use in offset printing which is entirely free of cyan compounds.

BACKGROUND OF THE INVENTION

An electrophotographic offset printing plate (hereinafter referred to as the "master") has a light-sensitive layer comprising fine particles of a photoconductive material (e.g., zinc oxide) dispersed in a resin binder; this plate is subjected to a conventional electrophotographic operation for forming an oleophilic image on the light-sensitive layer.

Offset printing generally uses a plate comprising a highly water wettable non-image area (hydrophilic area) and a poorly water wettable image area (oleophilic area). However, the master for use in electrophotographic offset printing has its image area composed of a hydrophobic photoconductive layer, so if the plate is immediately subjected to printing, the printing ink adheres to the non-image area and prevents normal operation. It is therefore necessary to render the non-image area of the master hydrophilic by desensitizing it before printing. Desensitizing solutions (also called "etching solution") that have been proposed to date are classified in two types, one type being a cyan compound containing solution mainly comprising a ferrocyanate (as described in U.S. Pat. No. 3,001,872) or ferricyanate, and the other type being a cyan free solution mainly comprising an amine cobalt complex (as described in U.S. Pat. No. 4,208,212), phytic acid (as described in U.S. Pat. No. 3,592,640 and Japenese Patent Publication No. 2839/83) or its derivative, or a guanidine derivative.

However, none of these processing solutions are completely satisfactory. The first type of solution containing a ferrocyanate or ferricyanate has the advantages of high desensitizing power, ability to form a strong hydrophilic film, and fast film formation. Nevertheless, the ferrocyanide or ferricyanide ion is unstable to heat and light, and when exposed to light, it undergoes either a color forming reaction or a precipitation reaction that weakens the desensitizing power of the solution. Furthermore, the presence of cyanide ions ($CN^-$) leads to the formation of a detectable free cyanide which is carried into the effluent and pollutes water-courses.

The cyan-free desensitizing solution has been proposed to eliminate these defects of the cyan-containing solution. But even this second type of desensitizing solution has been unable to provide a completely satisfactory lithographic printing master. Particularly, the cyan-free solution has a slower rate of hydrophilic film formation than the cyan compound-containing solution, and is unable to form an immediately printable, hydrophilic film of high physical strength by one pass through an etch processor, and as a result, scum often forms on the non-image area, or insufficient edge acuity of halftone dots occurs.

Inositol hexaphosphate esters and metal derivatives thereof are known to form chelate compounds with metals, and have already been proposed for use as desensitizers in the processing of the offset printing master as described in U.S. Pat. No. 3,592,640. However, these compounds have such a slow film forming rate that the desired hydrophilic film is not obtainable by a single pass through the processor, and the resulting poor ink separation may often cause scum on the non-image area or insufficient edge acuity of halftone dots.

In previously filed Japenese Patent Publication No. 5799/83, use has been proposed of an ion complex of a water-soluble cationic polymer and a mono- or divalent metal salt of an inositol hexaphosphate ester (e.g., sodium phytate, potassium phytate or calcium phytate). This complex has improved water retention but does not achieve a satisfactory etching speed. At the same time, the complex is highly dependent on moisture and is so sensitive to the printing environment that scum easily forms on the non-image area during printing at low humidity.

SUMMARY OF THE INVENTION

In order to overcome the problems discussed above, the present inventors have made extensive studies, and have now discovered that by using at least one member selected from the group of an ammonium salt and amine salt of the inositol hexaphosphate ester, instead of a mono- or divalent metal salt thereof, an ion complex having not only a higher etching speed, but also appreciably improved printing characteristics at low humidity can be produced.

Thus, according to the present invention, (a) at least one member selected from the group of an ammonium or amine salt of an inositol hexaphosphate ester, (b) a low molecular weight electrolyte, and (c) a water-soluble cationic polymer are used as the effective components of a cyan-free desensitizing solution, and an ion complex formed between the water-soluble cationic polymer and the ammonium or amine salt of the inositol hexaphosphate ester is effectively used in the invention.

DETAILED DESCRIPTION OF THE INVENTION

The ammonium and amine salts of the inositol hexaphosphate ester may be used either independently or as a mixture of the two salts, in any desired proportions. The resulting ion complex has the ability to form a strong, hydrophilic film and is adsorbed strongly to a chelate compound with metal ions, thereby improving significantly the hydrophilicity and film-forming properties of said compound. As a result, the desensitizing solution of the present invention provides a printing master that can be processed at high speed without causing scum on the non-image area or insufficient edge acuity in halftone dots.

Suitable examples of the water-soluble cationic polymer used in the desensitizing solution are water-soluble compounds having molecular weights in the range of from about 500 to 100,000 and having an amino group, imino group, tertiary amine group, quaternary ammonium salt group, or a hydrazine group in the molecule thereof. Specific examples include a melamine-formaldehyde resin, acetoguanamine-formaldehyde resin, benzoguanamine-formaldehyde resin, polyethyleneimine, polyamidepolyamine epichlorohydrin, aniline resin hydrochloride, polythiourea hydrochloride, cationized amino resin, polyvinylpyridine hydrochloride, cationically modified product of polyacrylamide (e.g., vinylamine polymer produced from polyacrylamide by the Hofmann degradation, polyacrylamide subjected to the Mannich reaction with formalin and secondary amine, or such polyacrylamide which is further converted to a quaternary ammonium salt with dimethyl sulfate), polyvinylbenzyl chloride converted to a quaternary ammonium salt with a tertiary amine, poly(N-vinyl-2-methylimidazoliummethyl sulfate), dimethylaminoethyl(meth)acrylate polymer or a quaternary ammonium salt thereof, amino group containing (meth)-acrylate polymer [diethylaminoethyl(meth)acrylate polymer or a quaternary ammonium salt thereof], a polyalkylimine compound of the type shown in U.S. Pat. No. 3,617,266 which is prepared from a polymer containing an aliphatic amino group in the repeating unit by converting all or part of the amino groups to either a salt or quaternized form, an amine adduct of epoxy resin, an amine adduct of a maleic polymer, an amino group containing polyamide resin, polyamide-epoxy resin and a polyamide-epichlorohydrin resin, preferably polyamide-polyamine epichlorohydrin, a polyamide-epichlorohydrin resin, polyethyleneimine converted to a quaternary ammonium salt with dimethyl sulfate, a melamine-formaldehyde resin and polyvinylbenzyl chloride converted to a quaternary ammonium salt with a tertiary amine.

Examples of the low molecular weight electrolyte also used in the desensitizing solution of the present invention include salts of inorganic acids such as sulfuric acid, hydrochloric acid, HBr, HI, HF, nitric acid, perchloric acid and $HPF_6$, as well as salts of organic acids such as organic sulfonic acid (e.g., methanesulfonic acid), amidosulfonic acid, organic phosphonic acid, oxalic acid, formic acid, trichloroacetic acid and picric acid. Compounds which are alkali metal salts, alkaline earth metal salts or ammonium salts of these acids and which have a water solubility of at least about 10 wt% at room temperature are used with advantage, preferably alkali metal salts or ammonium salts of nitric acid, sulfuric acid, carboxylic acid and sulfonic acid. Specific examples include NaCl, NaBr, KCl, KBr, LiCl, LiBr, $NH_4Cl$, $NaNO_3$, $KNO_3$, $NH_4NO_3$, $Ca(NO_3)_2$, $Mg(NO_3)_2$, $Na_2SO_4$, $K_2SO_4$, $MgSO_4$, $(NH_4)_2SO_4$, HCOONa, $CH_3COONa$, $(COONa)_2$, $Cl_3CCOONa$, $NH_4F$, $KPF_6$,

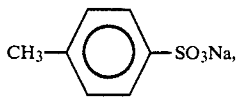

and $NH_4SO_3NH_2$, preferably $NH_4NO_3$, $Na_2SO_4$, $K_2SO_4$, $(NH_4)_2SO_4$, HCOONa,

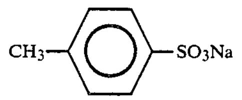

and sodium malonate.

The ammonium salt and amine salt of the inositol hexaphosphate ester are available as a commercial product, or they may be easily synthesized by known method as described, for example, in U.S. Pat. Nos. 2,691,035, 2,718,523, 2,750,400, 2,815,360 and 3,016,398, or synthesized by skilled worker in accordance with these methods. The ammonium salt of the inositol hexaphosphate ester is more preferred.

The respective components of the desensitizing solution according to the present invention are preferably used in the following amounts, with the total amount of the desensitizing solution being taken as 1,000 parts by weight: (a) at least one member selected from the group of the ammonium salt and amine salt of the inositol hexaphosphate ester, from 10 to 200 parts by weight, and more preferably from 40 to 75 parts by weight; (b) the low molecular weight electrolyte, from 20 to 150 parts by weight, and more preferably from 40 to 100 parts by weight; (c) the water-soluble cationic polymer, from 0.2 to 20 parts by weight, and more preferably from 1 to 10 parts by weight; and the remainder is substantially water.

These components are dissolved in ion-exchanged or tap water to make a sample of the desensitizing solution of the present invention. The order of addition of the respective components is not critical, but preferably, the ammonium salt or amine salt of the inositol hexaphosphate ester is first dissolved in water, then the low molecular weight electrolyte is added, followed by addition of an aqueous solution of the cationic polymer. The desensitizing solution may contain various additives such as a pH modifier (e.g., organic or inorganic acids, or basic hydroxide such as potassium hydroxide and sodium hydroxide), a pH buffer (e.g., phosphates), a wetting agent (e.g., ethylene glycol, sorbitol, glycerin or gum arabic), an antiseptic (e.g., salicylic acid, phenol, butylparabenzoate, or sodium dehydroacetate), and a rust inhibitor (e.g., EDTA or amines). The desensitizing solution of the present invention is preferably used at a pH in the range of from 3 to 6. It may be diluted with water for use as dampening water.

Thus, the cyan-free desensitizing solution of the present invention has the following advantages: it does not contain ferrocyanide or ferricyanide that is an environmental hazard and which is deteriorated by light or heat; it can be stored for an extended period without causing discoloration or precipitation; it is less sensitive to the printing environment than the prior art cyanfree solution; and it has such an improved film forming speed that it can be subjected to fast etching for making an offset printing master having no scum on the non-image area or which is free from insufficient edge acuity of halftone dots. Further, the cyan-free desensitizing solution of the present invention is also useful as the etching solution or dampening solution for the lithographic plate prepared from the conventional presensitized lithographic plate, i.e., the lithographic printing plate comprising the aluminum suppot having a lithographically suitable light-sensitive layer applied thereon.

According to a preferred embodiment the electrophotographic recording layer is rendered waterreceptive at the areas to be hydrophilized after the printing master has been mounted on the press, thus obviating any separate immersion treatment. The hydrophilizing treatment of said layer may be carried out by means of an absorbent pad impregnated with a desensitizing solution of this invention.

Electrophotographic recording materials, which are especially suited to be used in the preparation of a planographic printing plate, are described, e.g., in the United Kingdom Patent Specifications Nos. 1,125,580 and 1,125,579, and U.S. Pat. No. 4,456,670.

Any known process for forming the electrostatic latent image and hydrophobic image may be applied.

According to a common technique the hydrophobic image is formed by the consecutive steps of producing an electrostatic image on a photoconductive zinc oxide/hydrophobic binder layer by integrally electrostatically charging that layer, subsequently imagewise exposing and developing the latter with a hydrophobic developer powder, which is fixed to the recording layer, e.g., by heating.

The powder image can be formed by the known dry "carrier-toner development" or by a liquid development based on electrophoresis wherein charged hydrophobic particles are attracted from an electrically insulating liquid to the charged areas of the recording layer. Such development technique is described, e.g., in the U.K. Patent Specification No. 755,486.

The present invention is hereunder described in greater detail by reference to working examples and comparative examples.

EXAMPLE 1

| Components | Amount (parts by weight) |
|---|---|
| Water | 759 |
| Ammonium salt of inositol hexaphosphate ester (50% aq. soln.) | 76 |
| $CH_2(OH)COOH$ | 23 |
| NaCl | 61 |
| Polyamide-epichlorohydrin resin (30% aq. soln.) | 5 |
| Glycerin | 76 |

EXAMPLE 2

| Components | Amount (parts by weight) |
|---|---|
| Water | 713 |
| Ammonium salt of inositol hexaphosphate ester (50% aq. soln.) | 100 |
| $CH_2(OH)COOH$ | 30 |
| $NH_4Br$ | 50 |
| Polyethyleneimine quaternized with dimethylsulfuric acid | 7 |
| Glycerin | 100 |

EXAMPLE 3

| Components | Amount (parts by weight) |
|---|---|
| Water | 608 |
| Amine salt of inositol hexaphosphate ester (50% aq. soln.) | 80 |
| $CH_2(COOH)_2$ | 25 |
| $K_2SO_4$ | 80 |
| Melamine-formaldehyde resin (30% aq. soln.) | 7 |
| Sorbitol | 200 |

COMPARATIVE EXAMPLE 1

| Components | Amount (parts by weight) |
|---|---|
| Water | 770 |
| Ammonium salt of inositol hexaphosphate ester (50% aq. soln.) | 100 |
| $CH_2(OH)COOH$ | 30 |
| Glycerin | 100 |

COMPARATIVE EXAMPLE 2

| Components | Amount (parts by weight) |
|---|---|
| Water | 770 |
| Amine salt of inositol hexaphosphate ester (50% aq. soln.) | 100 |
| $CH_2(OH)COOH$ | 30 |
| Glycerin | 100 |

COMPARATIVE EXAMPLE 3

| Components | Amount (parts by weight) |
|---|---|
| Water | 865 |
| $CH_2(OH)COOH$ | 30 |
| Polyamide-epichlorohydrin resin (30% aq. soln.) | 5 |
| Glycerin | 100 |

COMPARATIVE EXAMPLE 4

| Components | Amount (parts by weight) |
|---|---|
| Water | 763 |
| Ammonium salt of inositol hexaphosphate ester (50% aq. soln.) | 100 |
| $CH_2(OH)COOH$ | 30 |
| Polyamide-epichlorohydrin resin (30% aq. soln.) | 7 |
| Glycerin | 100 |

COMPARATIVE EXAMPLE 5

| Components | Amount (parts by weight) |
|---|---|
| Water | 745 |
| Sodium salt of inositol hexaphosphate ester | 100 |
| $NH_4Br$ | 50 |
| Polyamide-epichlorohydrin resin (30% aq. soln.) | 5 |
| Glycerin | 100 |

An intermediate layer having the compositions shown below was coated on a paper base (103 g/m$^2$) laminated with an aluminum foil (10 $\mu$thick) to a thickness of 4 $\mu$by a conventional method.

| | parts by weight |
|---|---|
| Colloidal alumina ("Alumina Sol 200", a product of Nissan Chemical Industries, Ltd.) | 50 |
| Polyvinyl acetate ($M\overline{w}$ = 80,000) | 100 |
| Methanol | 100 |

A photosensitive layer having the following compositions was coated on the surface of the intermediate layer to a dry thickness of 25 g/m$^2$.

| | parts by weight |
|---|---|
| Photoconductive zinc oxide ("Sazex 2000", a product of Sakai Chemical Industry Co., Ltd.) | 100 |

-continued

| | parts by weight |
|---|---|
| Silicone resin ("KR-211", a product of Shinetsu Chemical Industry Co., Ltd.) | 35 |
| Rose bengale | 0.1 |
| Fluorescein | 0.2 |
| Methanol | 10 |
| Toluene | 150 |

The resulting photosensitive sheet was allowed to stand in a dark room at 40% RH and 25° C. for 12 hours.

The photosensitive layer was charged with a negative corona with a tension of −6,000 v on the corona wires and exposed through the graphic original. Development was carried out by using a commercially available liquid toner for plate-making. The toner image was fixed to the layer by heating.

A cotton pad was impregnated with the desensitizing solutions of Examples 1 to 3 and Comparative Examples 1 to 5, so as to make offset masters. In two different environments, printing was conducted on these masters, with five-fold aqueous dilutions of the respective desensitizing solutions being used as dampening water. The results are shown in Tables 1 and 2.

TABLE 1

| | (25° C. × 60% RH) | | | |
|---|---|---|---|---|
| | Etching Speed (sec) | No. of Sheets That Could Be Printed without Forming Scum on the Non-Image Area | Edge Acuity of Halftone Dots | Ink Separation |
| Ex. 1 | 8 | >4,000 | sharp | possible in 10 sec |
| Ex. 2 | 8 | >4,000 | sharp | possible in 10 sec |
| Ex. 3 | 8 | >4,000 | sharp | possible in 10 sec |
| Comp. Ex. 1 | 18 | 100 | not sharp | impossible |
| Comp. Ex. 2 | 18 | 100 | not sharp | impossible |
| Comp. Ex. 3 | 18 | 1 | not sharp | impossible |
| Comp. Ex. 4 | 18 | 1 | not sharp | impossible |
| Comp. Ex. 5 | 18 | >4,000 | sharp | possible in 10 sec |

TABLE 2

| | (20° C. × 30% RH) | | | |
|---|---|---|---|---|
| | Etching Speed (sec) | No. of Sheets That Could Be Printed without Forming Scum on the Non-Image Area | Edge Acuity of Halftone Dots | Ink Separation |
| Ex. 1 | 8 | >4,000 | sharp | possible in 10 sec |
| Ex. 2 | 8 | >4,000 | sharp | possible in 10 sec |
| Ex. 3 | 8 | >4,000 | sharp | possible in 10 sec |
| Comp. Ex. 1 | 18 | 1 | not sharp | impossible |
| Comp. Ex. 2 | 18 | 1 | not sharp | impossible |
| Comp. Ex. 3 | 18 | 1 | not sharp | impossible |
| Comp. Ex. 4 | 18 | 1 | not sharp | impossible |
| Comp. Ex. 5 | 18 | 1 | not sharp | impossible |

As Tables 1 and 2 show, the desensitizing solutions prepared in Examples 1 to 3 could be used as a high-speed etchant, and at least 4,000 sheets could be printed from the resulting masters irrespective of the environment. No scum formed on the non-image area of the masters or the printed sheets, and the latter had a good ink adhesion and sharp edge acuity of halftone dots.

However, the desensitizing solutions prepared in Comparative Examples 1 to 4 formed scum on the non-image area of masters even at low etching speed. Furthermore, ink separation was impossible and there was no edge sharpness in halftone dots. The desensitizing solution prepared in Comparative Example 5 was usable when the printing environment was 60% RH (relative humidity) and the etching time was extended; however, printing was impossible at 30% RH in spite of prolonged etching time.

As will be understood from the foregoing data, the desensitizing solution of the present invention containing an ammonium or amine salt of inositol hexaphosphate ester, a water-soluble cationic polymer, and a low molecular weight electrolytic compound as the effective components is not moisture dependent and achieves a very high etching speed.

While the invention has been described in detail and with reference to specific embodiments thereof, it will be apparent to one skilled in the art that various changes and modifications can be made therein without departing from the spirit and scope thereof.

What is claimed is:

1. A ferrocyanide-free and ferricyanide-free desensitizing solution for use in offset printing comprising as the effective ingredients:

(a) at least one member selected from the group of an ammonium salt and amine salt of inositol hexaphosphate ester;

(b) a water-soluble cationic polymer; and (c) a low molecular weight electrolytic compond selected from a salt of an inorganic acid or a salt of an organic acid.

2. A desensitizing solution for use in offset printing as in claim 1, wherein ingredient (a) is used in an amount of from 10 to 200 parts by weight, ingredient (b) is used in an amount of from 20 to 150 parts by weight, and ingredient (c) is used in an amount of from 0.2 to 20 parts by weight, per 1,000 parts by weight of the desensitizing solution.

3. A desensitizing solution for use in offset printing as in claim 1, wherein ingredient (a) is used in an amount of from 40 to 75 parts by weight, ingredient (b) is used in an amount of from 40 to 100 parts by weight, and ingredient (c) is used in an amount of from 1 to 10 parts by weight, per 1,000 parts by weight of the desensitizing solution.

4. A desensitizing solution for use in offset printing as in claim 1, wherein the pH of the desensitizing solution is in the range of from 3 to 6.

5. A desensitizing solution for use in offset printing as in claim 2, wherein the pH of the desensitizing solution is in the range of from 3 to 6.

6. A desensitizing solution for use in offset printing as in claim 3, wherein the pH of the desensitizing solution is in the range of from 3 to 6.

7. A desensitizing solution for use in offset printing as in claim 1, wherein the water-soluble cationic polymer ingredient (b) is a water-soluble compound having a molecular weight in the range of from about 500 to 100,000 and having an amino group, imino group, tertiary amine group, quaternary ammonium salt group or a hydrazine group in the molecule thereof.

8. A desensitizing solution for use in offset printing as in claim 2, wherein the water-soluble cationic polymer ingredient (b) is a water-soluble compound having a molecular weight in the range of from about 500 to 100,000 and having an amino group, imino group, tertiary amine group, quaternary ammonium salt group or a hydrazine group in the molecule thereof.

9. A desensitizing solution for use in offset printing as in claim 4, wherein the water-soluble cationic polymer ingredient (b) is a water-soluble compound having a molecular weight in the range of from about 500 to 100,000 and having an amino group, imino group, tertiary amine group, quaternary ammonium salt group or a hydrazine group in the molecule thereof.

10. A desensitizing solution for use in offset printing as in claim 5, wherein the water-soluble cationic polymer ingredient (b) is a water-soluble compound having a molecular weight in the range of from about 500 to 100,000 and having an amino group, imino group, tertiary amine group, quaternary ammonium salt group or a hydrazine group in the molecule thereof.

11. A desensitizing solution for use in offset printing as in claim 1, wherein the inorganic acid is sulfuric acid, hydrochloric acid, HBr, HI, HF, nitric acid, perchloric acid or $HPF_6$.

12. A desensitizing solution for use in offset printing as in claim 1, wherein the organic acid is organic sulfonic acid, amido sulfonic acid, organic phosphonic acid, organic carboxylic acid, or picric acid.

13. A desensitizing solution for use in offset printing as in claim 1, wherein the salt of ingredient (c) is an alkali metal salt, an alkaline earth metal salt or an ammonium salt.

14. A desensitizing solution for use in offset printing as in claim 1, wherein the ingredient (c) is an alkali metal salt or ammonium salt of nitric acid, sulfuric acid, carboxylic acid or sulfonic acid.

15. A desensitizing solution for use in offset printing as in claim 1, wherein the ingredient (c) is one member from the group consisting of NaCl, NaBr, KCl, KBr, LiCl, LiBr, $HN_4Cl$, $NaNo_3$, $KNO_3$, $NH_4NO_3$, $Ca(NO_3)_2$, $Na_2SO_4$, $K_2SO_4$, $MgSO_4$, $(NH_4)_2SO_4$, HCOONa, $CH_3COONa$, $(COONa)_2$, $Cl_3CCOONa$, $NH_4F$, $KPF_6$,

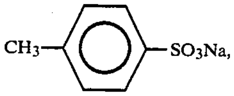

$NH_4SO_3NG_2$, and sodium malonate

* * * * *